Oct. 27, 1970

B. I. BONGA 3,536,603

ELECTRICAL CONNECTORS TO A WORKPIECE
IN ELECTRO-EROSION MACHINES

Filed Dec. 6, 1967

INVENTOR
BENNO IBO BONGA

BY Hanke, Krass, Gifford, + Patalidis

ATTORNEYS

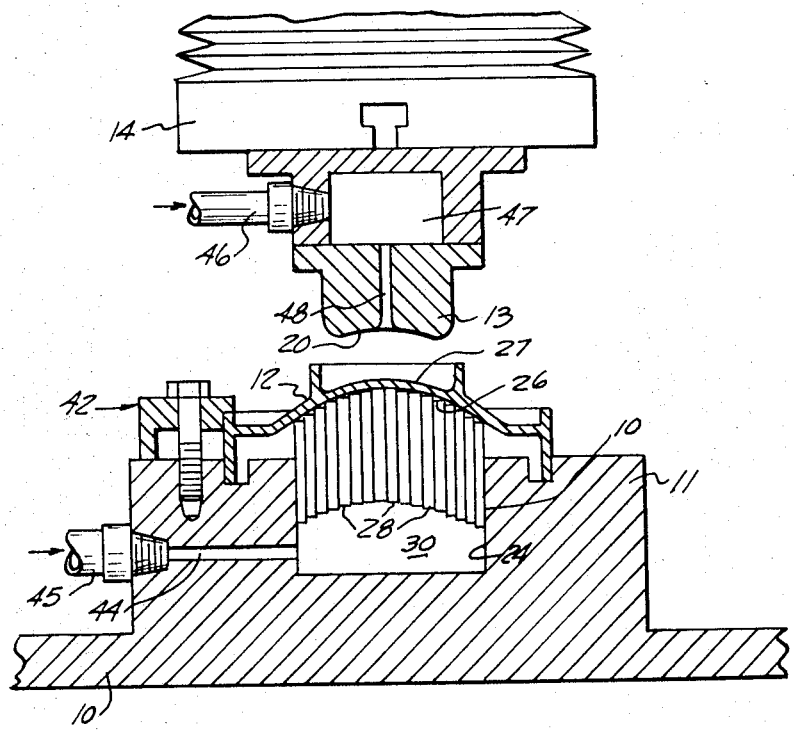
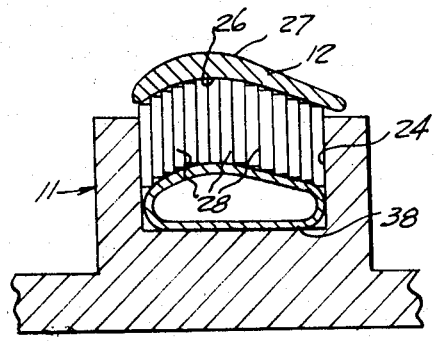
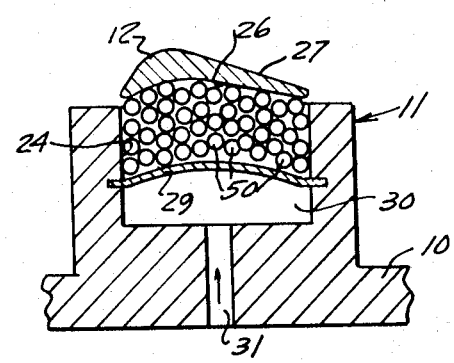

United States Patent Office 3,536,603
Patented Oct. 27, 1970

3,536,603
ELECTRICAL CONNECTORS TO A WORKPIECE
IN ELECTRO-EROSION MACHINES
Benno Ibo Bonga, Onex, Geneva, Switzerland, assignor, by mesne assignments, to Anocut Engineering Company, Elk Grove Village, Ill., a corporation of Illinois
Filed Dec. 6, 1967, Ser. No. 688,428
Claims priority, application Switzerland, May 5, 1967, 6,457/67
Int. Cl. B01k 3/00; B23p 1/04
U.S. Cl. 204—224                   15 Claims

ABSTRACT OF THE DISCLOSURE

Electrical connectors adapted to engage a non-planar surface of a workpiece held in the workpiece holding fixture of an electro-erosion machining apparatus, consisting of a plurality of individually movable current conducting members electrically connected to a terminal of the power supply of the apparatus, combined with means for constantly urging the members in engagement with a surface of the workpiece in order to insure adequate electrical contact.

BACKGROUND OF THE INVENTION

Field of the invention

The present invention relates to and has particular usefulness in electro-erosion machining of conductive workpieces. Electro-erosion shaping and machining either by electrical discharges in the presence of a dielectric or by electrochemical action in the presence of a conductive electrolyte are industrial machining processes which are receiving acceptance in the industry as the result of the ability of the processes to accurately machine workpieces to shapes and contours which are difficult to achieve by more conventional machining means and to easily remove material from workpieces made of a material practically unmachinable by more conventional processes.

The present invention has application in both electrical discharge machining apparatus and processes and electrochemical machining apparatus and processes, although it has more particular usefulness in electrochemical machining wherein heavy machining electrical current flows are very prevalent at the present stage of technological development. Electrical discharge machining is however progressing to the point that power supplies are rapidly becoming capable of supplying important electrical currents to the workpiece electrode tool assembly, and the invention may consequently be used to advantage also in such high current electrical discharge machining apparatus and processes. The invention will, however, herein disclosed in typical electrochemical machining applications, for illustrative purposes only.

Electrochemical machining consists in electrically eroding portions of a workpiece by passing a high density direct current of substantially low voltage between the workpiece and an appropriately shaped electrode through an electrolyte filling the space separating the workpiece from the electrode face, the electrolyte being generally caused to circulate at a high velocity and under a high pressure. The current intensity may reach several hundred or thousand amperes. In applications where the workpiece presents a substantial area which is sought to be electrochemically machined, combined with a shape and volume affording a substantially narrow path to the passage of the current, the use of such high current density causes a considerable increase in temperature of the workpiece as a result of the ohmic resistance afforded by the workpiece to the passage of the current. Such inconveniences and shortcomings are particularly prevalent when the workpiece is substantially thin as is the case, for example, when the workpiece is a gas turbine blade or the like.

When it is desired to electrochemically machine a face of a workpiece such as a turbine blade, it is not convenient to establish a continuous path for the electric current, which may be of several hundred or thousand amperes, through the root of the blade, or any other portion thereof which is usually held in the workpiece holding and clamping fixture, in view of the resulting small cross area presented to the passage of the current. In order to supply to the blade a large electrical current, it is more convenient to bring such current through the face of the blade opposite to the face to be machined. However the face available for electrical connection has often a non-planar surface such that great difficulties are present for establishing appropriate means for establishing a good electrical contact with such face. In order to establish such electrical connection, metallic braids have been used in engagement against a face of the workpiece, in order to provide a plurality of contact points between the workpiece and the current supply line. Such an arrangement, however, has not been found to appreciably improve the transfer of electrical current from the supply line to the workpiece because the contact areas between the wire braids and the workpiece surface which provide good electrical contact relatively thereto are relatively few. There is considerable heating of the few good contact points and the braid provides an unsatisfactory means for dissipating the heat generated. The result is a local burning of the braid ends and of some areas of the workpiece surface, and even accidental welding between the braid strands and the workpiece.

The present invention provides means for placing a workpiece, in electrochemical machining and the like, in appropriate high density current transferring contact with an electrical current supply line, by means providing a good electrical contact capable of conforming with a non-planar surface of the workpiece, thus preventing the inconvenience and disadvantages of prior art apparatus.

SUMMARY OF THE INVENTION

The principal object of the present invention, therefore, is to provide an improved means for insuring a continuous electrical path between the current supply line and a workpiece in an electro-erosion machining apparatus by providing a plurality of contacting members electrically connected to such supply line and individually displaceable so as to each engage a portion of the workpiece for providing good electrical contact therewith.

Another object of the present invention is to provide simple means for urging such conducting members in contact with a surface area of the workpiece, irrespective of the shape or contour of such surface area.

These and other objects and advantages of the present invention will become apparent to those skilled in the art when the description of a few examples of practical

BRIEF DESCRIPTION OF THE DRAWINGS

FIG. 3 is a view similar to FIG. 2, but showing a further modification of the present invention;

FIG. 5 illustrates a further modification of the present invention; and

FIG. 6 represents yet another modification of the present invention.

DESCRIPTION OF THE PREFERRED EMBODIMENTS

Figure 1:
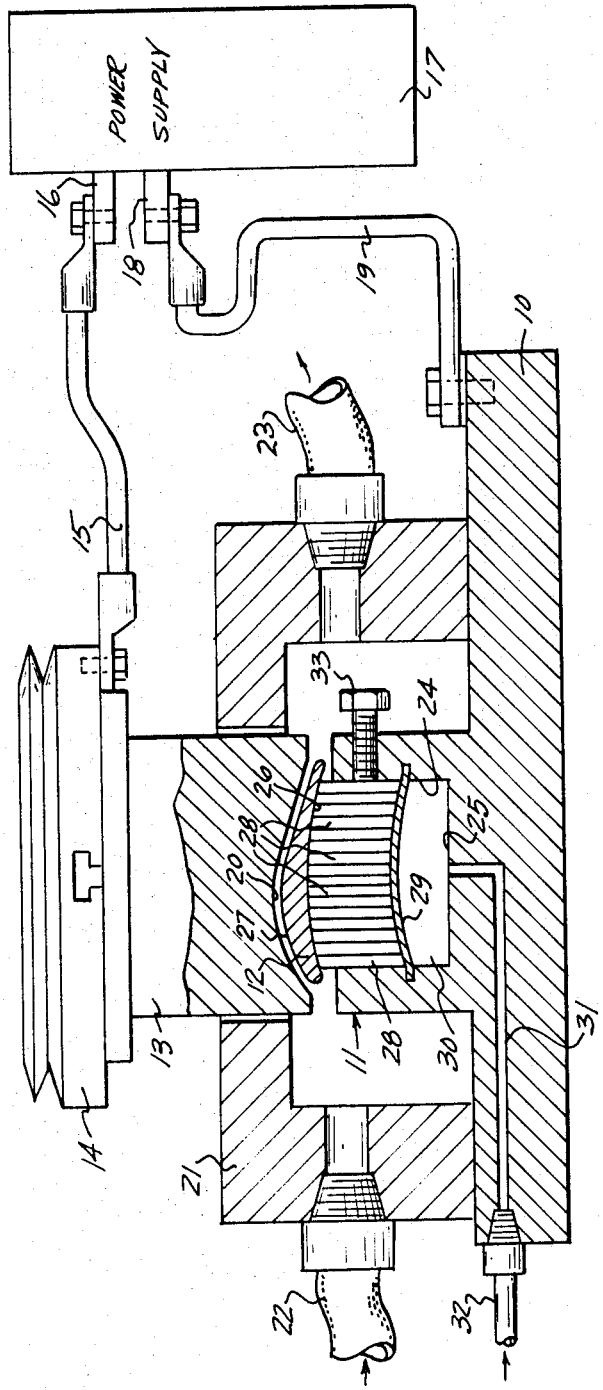
FIG. 1 schematically represents in section an electro-erosion or electrical machining apparatus of the electrochemical type provided with means for bringing electrical current to the workpiece, according to a first aspect of the present invention.

Referring now to FIG. 1, there is schematically shown an electrical machining apparatus of the electrochemical machining type comprising a support base 10 provided with an integral or separate support member and electrical contact fixture 11 for a workpiece 12. The workpiece 12 is held in proximity with an electrode 13, of appropriate shape and made of a current conductive metal. The electrode 13 is supported by a reciprocable ram of platen 14 and is electrically connected by means of a conductor cable 15 to a terminal 16 of a direct current power supply 17. The support base 10 is connected to the other terminal 18 of the power supply 17 by means of a cable 19.

Workpiece 12 is held in position by clamps, or other means, not shown, and is placed, together with the active surface end 20 of the electrode 13, in an enclosure 21, made of a non-conductive material, and which is provided with an electrolyte inlet 22 and an outlet 23.

The support member 11 for the workpiece is provided with a cavity 24 having a closed end 25 and an open end proximate the surface area 26 of the workpiece 12 which is opposite the surface 27 contiguous to the active face 20 of the electrode 13. In the cavity 24, projecting from the open end thereof, there is a plurality of vertically disposed, as shown in the drawing, electrically conductive metallic rods 28. The metallic rods 28, made of copper or the like good conductive metal, are preferably rectangular or square in cross-section in order to afford a greater area for the passage of current therethrough, and are disposed in a bundle in sliding engagement with each other with their lower ends abutting a flexible wall 29 separating the main portion of the cavity 24 from a chamber 30 disposed between such flexible deformable wall 29 and the closed end 25 of the cavity. Chamber 30 is placed in communication by means of a passageway 31 with a line 32 connected to a source of pressurized fluid, not shown.

Movable ram 14 is displaceable, by servo or power means not shown, so as to linearly move electrode 13 toward and away from the workpiece 12. Before proceeding to the electrochemical machining of the workpiece 12 which, as shown in profile, is shaped as a gas turbine blade, ram 14 is lifted and the workpiece 12 is clamped in position as shown. Pressurized fluid is introduced into chamber 30 through passageway 31, and the pressure of the fluid in chamber 24 causes flexible wall 29 to be deformed such as to displace the plurality of metallic rods 28 upwardly, as seen in the drawing, until their upper ends engage surface 26 of the workpiece 12. The metallic rods 28 may then be clamped together by means such as one or several screws 33 such that the rods are held in engagement with each other and the pressurized fluid may be removed from chamber 30. The clamping of the metallic rods 28 improves the collective current conducting capacity of the rods by providing an improved electrical contact therebetween.

Electrochemical machining of the face 27 of the workpiece 12 may then be effected in the usual manner. Electrode 13 is linearly displaced downwardly by means of ram 14 such that the face 20 of electrode 13 is in close proximity to the surface 27 of the workpiece 12. An appropiate electrolyte is circulated in the space between the active face 20 of the electrode 13 and the face 27 of the workpiece by being introduced at high pressure and high velocity within enclosure 21 by means of inlet pipe 22 and being exhausted therefrom by way of outlet pipe 23. The power supply 17 is switched on. In view of the multitude of substantial contact areas between the ends of the metal rods 28 and the non-planar surface 26 of workpiece 12, a current of high density may be transferred through such areas to the workpiece 12 without causing any exaggerated heating thereof.

Figure 2:
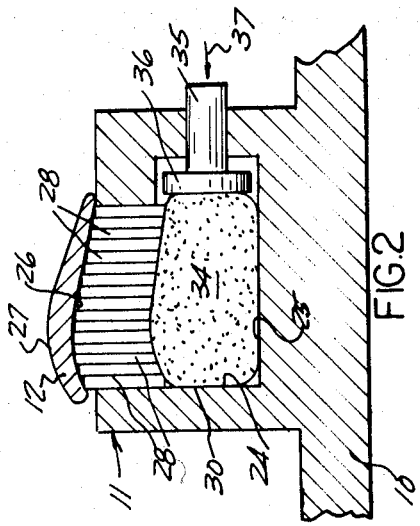
FIG. 2 schematically represents a portion of the apparatus of FIG. 1, showing a modification of the invention.

FIG. 2 represents a modification of the invention wherein the lower ends, as seen in the drawing, of metallic rods 28 are adapted to engage a portion of the outer surface of a deformable resilient block 34 made of a material such as rubber or the like, and which is adapted to substantially fill the space of chamber 30. A plunger member 35 is slidably disposed through a sidewall of chamber 30 and has an enlarged piston-like end portion 36 adapted to engage a portion of the surface of resilient block 34 as a result of a displacement of the plunger member in the direction of arrow 37. The deformation of resilient block 34 under the action of plunger 35 as a result of the confinement of the block in chamber 30 may be effected only in a direction that urges rods 28 upwardly, as seen in the drawing, so as to engage the upper ends thereof with the non-planar contact surface 26 of workpiece 12, clamped on the top of support member 11.

FIG. 3 represents a further modification of the present invention wherein an inflatable bladder-like enclosure 38 made of rubber or the like is disposed in the bottom of cavity 24 in workpiece support and holding fixture 11. The bladder-like enclosure 38 is inflated by a pressurized fluid, such as compressed air, so as to displace and urge rods 28 toward the contact suface 26 of workpiece 12.

Figure 4:
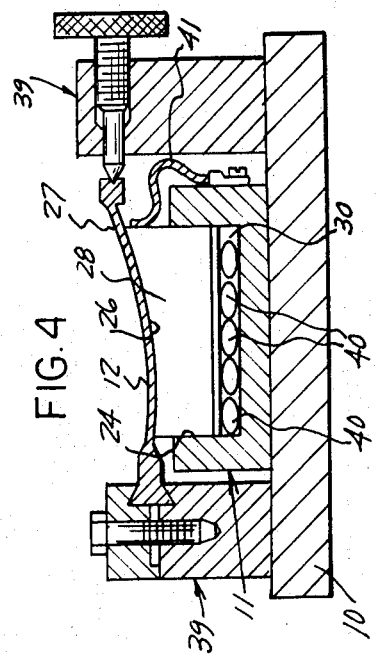
FIG. 4 schematically represents in the section an example of an embodiment according to another modification of the present invention.

In FIG. 4 there is shown a further modification of the invention wherein a substantially thin laminar workpiece 12 appropriately clamped in position for electrochemical machining by means of holding and clamping fixture 30, forming no part of the present invention, is provided with a plurality of contact metallic plates, one of which is shown in elevation at 28, which are adapted to engage the contact surface 26 of the workpiece. The metallic plates are slidably disposed side by side in cavity 24 in box-like fixture 11 affixed to support base 10 and are upwardly urged by way of a plurality of rubber hoses 40, or the like, disposed at the bottom of the cavity 24 and capable of being inflated, for example, by means of compressed air, so as to displace upwardly the lower ends of the plates to cause the upper ends thereof to contact surface 26 of the workpiece 12. For the purpose of effecting an improved electrical contact between the bundle of plates 28 and the support base 10, a plurality of current conductive cables, one of which is shown at 41, have one end welded to one of the plates 28 and their other end connected to fixture 11 or support base 10 in order to reduce the voltage drop that may occur at the contact surfaces between the plates 28 and the inner walls of the fixture 11.

FIG. 5 illustrates a further modification of the invention wherein a thin walled workpiece 12 is clamped in position over the open end of cavity 24 in fixture 11 by means of, for example, clamping means 42. Workpiece 12 has a face 26 placed in electrical contact with support base 10 and holding fixture 11 by means of a plurality of metallic rods 28 slidably disposed in cavity 24. Rods 28 are short enough so that when their upper ends engage face 26 of workpiece 12, there is formed a space or chamber 30 at the bottom of cavity 24, chamber 30 being placed in communication by means of passageway 44 and a line 45 with the pressure side of the electrolyte supply system of the electrochemical machining apparatus. As a result of such an arrangement, when the electrolyte flow is turned on, pressurized electrolyte introduced into chamber 30 causes a force to be exerted on the lower ends of rods 28 urging the upper ends thereof in engagement with the face 26 of workpiece 12. FIG. 5 shows a different type of electrode tool 13 wherein pressurized electrolyte is supplied to the interspace between the active face 20 of the electrode tool and the surface 27 of the workpiece 12 by means of a supply line 46 leading into a manifold 47 having one or several passageways delivering electrolyte, flowing at high velocity, to the active face 20 of the electrode tool.

As previously indicated, rods 28 in the embodiments of FIGS. 1–3 and 5 are preferably rectangular or square in cross-section, although it is evident that circularly cylindrical rods may be used, even though they may present the disadvantage of reduced electrical contact areas between the diverse rods and reduced electrical contact between the ends of the rods and the contact surface of the workpiece. For production work wherein a plurality of substantially similarly shaped workpieces are to be electrochemically machined, it is convenient to shape, by filing or grinding, the upper ends of the rods or plates 28 so as to provide a composite contour or shape better conforming to the contour or shape of the contact face of the workpiece, so as to establish an improved electrical contact therewith as a result of increasing the individual areas engaging each other.

FIG. 6 shows a further modification of the present invention wherein the plurality of metal rods utilized in the preceding embodiments is replaced by a plurality of electrically conductive metallic balls 50 capable of being displaced against the contact face 26 of workpiece 12 as a result of the deformation of a flexible wall 29 forming the upper wall of a space or chamber 30 adapted to be filled by a fluid under pressure, such as a hydraulic fluid, the pressurized electrolyte, or compressed air, introduced into the chamber through a passageway 31 formed in support base 10.

While it will be apparent that the preferred embodiments of the invention herein disclosed are well calculated to fulfill the objects above stated, it would be appreciated by those skilled in the art that the invention is susceptible of modification, variation and change without departing from the proper scope or fair meaning of the subjoined claims.

What is claimed is:

1. In an apparatus for electrically machining a surface area of a conductive workpiece in the presence of a liquid fluid including means for holding said workpiece and means electrically connecting said workpiece to a terminal of a source of electrical power, the improvement comprising:
   a plurality of individual relatively displaceable conducting members disposed in contact with each other in a common enclosure;
   means electrically connecting said conducting members to said terminal of the source of electrical power; and
   means for urging said conducting members in engagement with a surface area of said workpiece other than said area to be electrically machined.

2. The improvement of claim 1 wherein said enclosure forms parts of said means for holding the workpiece.

3. The improvement of claim 2 wherein said conducting members are parallely disposed metal rods having each an end engaging a portion of the surface area of said workpiece other than said area to be electrically machined.

4. The improvement of claim 3 further comprising means for clamping said metal rods in position with an end thereof engaging a portion of the surface area of said workpiece other than said area to be electrically machined.

5. The improvement of claim 2 wherein said conducting members are metal balls.

6. The improvement of claim 2 wherein the means for urging said conducting members in engagement with a surface area of said workpiece other than said area to be electrically machined is a fluid pressure force exerted upon said conducting members in a direction displacing said members toward said surface area.

7. The improvement of claim 6 wherein said fluid is the liquid fluid used in the electrical machining of said workpiece.

8. The improvement of claim 2 wherein the means for urging said conducting members in engagement with a surface area of said workpiece other than said area to be electrically machined comprises:
   a block made of a deformable resilient material disposed in said enclosure in engagement with said conducting members; and
   a rigid plunger member displaceable against said block for resiliently deforming the same for causing said deformed block to urge said conducting members in a direction displacing said conducting members toward said workpiece.

9. In an apparatus for electrically machining a first surface area of a conductive workpiece in the presence of a liquid fluid, an improvement for electrically connecting said workpiece to a terminal of a source of electrical power comprising:
   a holding and clamping fixture for said workpiece;
   a cavity disposed in said fixture, said cavity having a closed end and an open end adapted to be obturated by a second surface area of said workpiece when securedly held in position in said fixture;
   a plurality of individual relatively displaceable conducting members disposed in contact with each other in said cavity;
   means electrically connecting said conducting members to said terminal of said source of electrical power; and
   means in said cavity disposed proximate the closed end thereof for normally urging said conducting members in conformable engagement with said second surface area of the workpiece.

10. The improvement of claim 9 wherein the means for normally urging said conducting members in conformable engagement with said second surface area of the workpiece comprises a deformable resilient block and a rigid plunger member controllably displaceable against said block for resiliently deforming and displacing the same in a direction causing said conducting member to be urged in conformable engagement with said second surface area of the workpiece.

11. The improvement of claim 9 wherein said conducting members are a plurality of metal balls.

12. The improvement of claim 10 wherein said conducting members are individually longitudinally displaceable metal rods disposed in contact with each other and each having an end abutting said block and another end engageable with a portion of said second surface area of the workpiece.

13. The improvement of claim 9 wherein the means for normally urging said conducting members in conformable engagement with said surface area comprises a space disposed between said connecting members and said closed end of said cavity and means for controllably introducing pressurized fluid in said space for displacing and urging said connecting members toward said second surface area of the workpiece.

14. The improvement of claim 13 wherein said pressurized fluid is the liquid fluid.

15. The improvement of claim 13 wherein said space comprises at least one deformable wall adapted to transmit the force exerted by said pressurized fluid to said conducting members.

References Cited

UNITED STATES PATENTS

| | | | |
|---|---|---|---|
| 349,535 | 9/1886 | Sohner | 204—297 XR |
| 2,721,839 | 10/1955 | Taylor | 204—297 XR |
| 2,766,194 | 10/1956 | Certa | 204—297 XR |
| 3,433,727 | 3/1969 | Keeleric | 204—224 |
| 3,449,226 | 6/1969 | Williams | 204—297 XR |

JOHN H. MACK, Primary Examiner

D. R. VALENTINE, Assistant Examiner

U.S. Cl. X.R.

204—279, 297; 219—69

Dedication 3,536,603.—*Benno Ibo Bonga*, Onex, Geneva, Switzerland. ELECTRICAL CONNECTORS TO A WORKPIECE IN ELECTRO-EROSION MACHINES. Patent dated Oct. 27, 1970. Dedication filed Dec. 23, 1971, by the assignee, *Anocut Engineering Company*.

Hereby dedicates to the Public the portion of the term of the patent subsequent to Dec. 24, 1971.

[*Official Gazette April 11, 1972.*]